United States Patent [19]
Ida et al.

[11] Patent Number: 5,666,172
[45] Date of Patent: Sep. 9, 1997

[54] FLAT PANEL DISPLAY DEVICE

[75] Inventors: Kazushige Ida; Tetsuya Murai, both of Tokyo, Japan

[73] Assignee: Kabushiki Kaisha Toshiba, Kawasaki, Japan

[21] Appl. No.: 635,716

[22] Filed: Apr. 22, 1996

[30]  Foreign Application Priority Data

Apr. 16, 1995  [JP]  Japan ................................ 8-094195
Apr. 20, 1995  [JP]  Japan ................................ 7-094089

[51] Int. Cl.$^6$ ................ G02F 1/1333; G02F 1/1335; G01D 11/28
[52] U.S. Cl. ................ 349/58; 349/65; 362/29; 362/31
[58] Field of Search ................ 349/58, 60, 65, 349/62; 362/29, 31, 375, 368

[56]  References Cited

U.S. PATENT DOCUMENTS

| | | | |
|---|---|---|---|
| 5,146,354 | 9/1992 | Plesinger | 349/58 |
| 5,182,660 | 1/1993 | Tanaka | 349/60 |
| 5,280,372 | 1/1994 | Horiuchi | 349/58 |
| 5,293,262 | 3/1994 | Adachi et al. | 349/58 |
| 5,299,038 | 3/1994 | Hamada et al. | 349/65 |
| 5,334,993 | 8/1994 | Okajima et al. | 349/65 |
| 5,499,129 | 3/1996 | Satou et al. | 349/58 |

*Primary Examiner*—William L. Sikes
*Assistant Examiner*—Tiep H. Nguyen
*Attorney, Agent, or Firm*—Cushman Darby & Cushman IP Group of Pillsbury Madison & Sutro, LLP

[57]  ABSTRACT

One side wall of a liquid crystal display device (11) having a surface iluminant light source (backlight) is formed by one side wall (521) of an outer frame (bezel cover) (500) and a vertical wall of a lamp cover (850). In this liquid crystal display device (11), the lower end of the side wall (521) of the outer frame (500) and the upper end of the cover (850) are provided with bent ends (853, 523) and these bent ends (853, 523) engage with each other. In this way it is possible to make the display than and lightweight while maintaining ample rigidity. Also, the liquid crystal panel (100) is not readily damaged by shocks from outside. Furthermore, replacement of the linear light source (811) is extremely easy.

14 Claims, 10 Drawing Sheets

FLAT PANEL DISPLAY DEVICE

BACKGROUND OF THE INVENTION

1. Technological Field

This invention relates to a flat panel display device having a flat display panel, made up of multiple display pixels, and a surface iluminant light source.

2. Prior Art

Flat panel display devises typified by liquid crystal display device have come to be used for various display devices such as personal computer and word processor display devices and television screens.

This kind of display generally comprises a flat display panel having a display area made up of multiple display pixels and a surface iluminant light source disposed behind the flat display panel.

In recent years, to make flat panel display devices thinner, instead of the conventional surface iluminant light source disposed directly underneath the flat display panel, edge-light type surface iluminant light sources have come to be used.

An edge-light type surface iluminant light source usually consists of a light-transmitting plate and a linear light source disposed near one side of the light-transmitting plate. The light-transmitting plate is for example made of acrylic resin and substantially flat and has an opaque scattering pattern formed on its rear side by printing. The linear light source is usually a fluorescent lamp comprising a cathode tube. Light from the linear light source is directed into the light-transmitting plate and is reflected and transmit inside the light-transmitting plate. Light reaching the scattering pattern on the light-transmitting plate is scattered and emerged through the main surface side of the light-transmitting plate.

With this kind of edge-light type surface iluminant light source, because the thickness of the surface iluminant light source can be made roughly the thickness of the light-transmitting plate, the flat panel display device can be made thinner.

In a flat panel display device, generally, a first frame on the display side of the flat panel display device together with a second frame holding the surface iluminant light source receives, sandwiches and fixes the flat display panel. In this way the surface iluminant light source is fixed to the flat display panel and the flat display panel is protected from external shocks.

FIG. 13 and FIG. 14 schematically show a typical example of a structure of an end part of a conventional flat panel display device in which a linear light source (1811) is disposed. In the drawings and the following description, the display side of the flat panel display device is the upper side thereof.

A vertical side wall (1521) of a first frame (1500) together with a vertical wall (1851) of a cross-sectionally L-shaped lamp cover (1850) forms a side wall of a flat panel display device (1000). Both of the vertical walls (1521, 1851) are flat sheets with straight edges, and their ends overlap with the lower end of the vertical side wall (1521) of the first frame on the outside. Screw holes are provided in the ends of the lamp cover (1850) and the lamp cover (1850) is fixed to the flat panel display device (1000) by screws (1853) being passed through these screw holes and screwed into threaded holes provided in a second frame (1600) at corners of the flat panel display device (1000). A first feed lead is connected to the end of a linear light source (1811) on an electrical feed supply side thereof, a second feed lead is connected to the other end and the second feed lead (1815) is led between the second frame (1600) and the vertical wall (1851) of the lamp cover.

Replacement of the linear light source (1811) is carried out by removing the screws (1853), pulling off the lamp cover (1850) downward pulling out the linear light source (1811) and the second feed lead (1815) and refitting them in the same way.

However, along with displays being made thinner as mentioned above their frames have also been being made smaller, and as a result of this the rigidity of the casing holding the flat display panel has been decreased. Furthermore, in recent years, to reduce the weight of displays there has been a tendency for the frame metal thickness to be reduced also, and if the rigidity of the casing holding the flat display panel falls further there is a possibility that the flat display panel will easily be damaged by shocks from outside.

SUMMARY OF THE INVENTION

The present invention was devised to deal with the above-mentioned technological problems, and an object of the invention is to provide a flat panel display device with which it is possible to maintain an ample rigidity even when the display is made thin and light and of which the flat display panel is not readily damaged by shocks from outside.

A first aspect of the invention provides a flat panel display device comprising a flat display panel having a display area, a first frame for receiving the flat display panel which exposes the display area of the flat display panel and has a side wall corresponding to a side part of the flat display panel, a surface iluminant light source comprising a light source and a light-transmitting plate for transmitting and selectively emerging light from the light source, a second frame for receiving the surface iluminant light source and holding the flat display panel between the first and second frames and a light source protecting member for holding the light source between the light source protecting member and the second frame, wherein an upper end portion of one side of the light source protecting member includes a first bent and a lower end portion of one side wall of the first frame includes a second bent and the first and second bent ends engage with each other.

Because the side wall of the first frame is provided with a bent end it is possible to secure ample rigidity even if the length of the side wall of the first frame is made short along with the flat panel display device being made thin. Furthermore, because there is provided the light source projecting member which engages with this bent end and holds the linear light source between itself and the second frame, the flat display panel and the surface iluminant light source are housed in a strong casing and the flat display panel is prevented from being damaged by shocks from outside. Also, by forming the engaging parts it is possible to reduce or dispense with screw-fastening of the light source protecting member and replacement, of the light source becomes extremely easy.

A second aspect of the invention provides a flat panel display device according to the first aspect wherein a first feed lead is connected to the end of the linear light source on an electrical feed supply side thereof and a second feed lead is connected to, the other end and the second feed lead led from said other end to the electrical feed supply is positioned at a higher level than the linear light source.

A third aspect of the invention is characterized in that the second feed lead and the light source are separated by the second frame.

A fourth aspect of the invention is characterized in that the second feed lead is disposed directly above the light source.

A fifth aspect of the invention is characterized in that a first feed lead is connected to the end of the light source on an electrical feed supply side thereof and a second feed lead is connected to the other end and the second feed lead led from said other end to the electrical feed supply side is positioned at a lower level than the linear light source.

A sixth aspect of the invention is characterized in that the second feed lead is disposed directly below the light source.

A seventh aspect of the invention is characterized in that a first feed lead is connected to the end of the light source on an electrical feed supply side thereof and a second feed lead is connected to the other end and the second feed lead led from said other end to the electrical feed supply side is tape-shaped.

An eighth aspect of the invention is characterized in that the second feed lead comprises a flexible flat cable or a printed wiring board.

A ninth aspect of the invention is characterized in that the second feed lead is disposed to the side of the light source.

A tenth aspect of the invention is characterized in that the light source protecting member is disposed pivotably about engaging portions of the bent ends and the light source is exposed and rendered replaceable by pivoting of the light source protecting member.

An eleventh aspect of the invention is characterized in that the light source protecting member is disposed slidably along the longitudinal axis of the light source and the light source is exposed and rendered replaceable by sliding of the light source protecting member.

A twelfth aspect of the invention is characterized in that the bent end of the first frame is a flange portion projecting outward, the bent end of the light source protecting member is a flange portion projecting inward and the bent end of the light source protecting member is disposed above the bent end of the first frame.

A thirteenth aspect of the invention is characterized in that the light source protecting member is L-shaped in cross-section and comprises a vertical wall corresponding to said side wall of the first frame and a horizontal wall bent from the vertical wall.

A fourteenth aspect of the invention is characterized in that the second frame is disposed between the light source and the vertical wall of the light source protecting member.

DETAILED DESCRIPTION OF THE PREFERRED EMBODIMENTS

Figure 1:
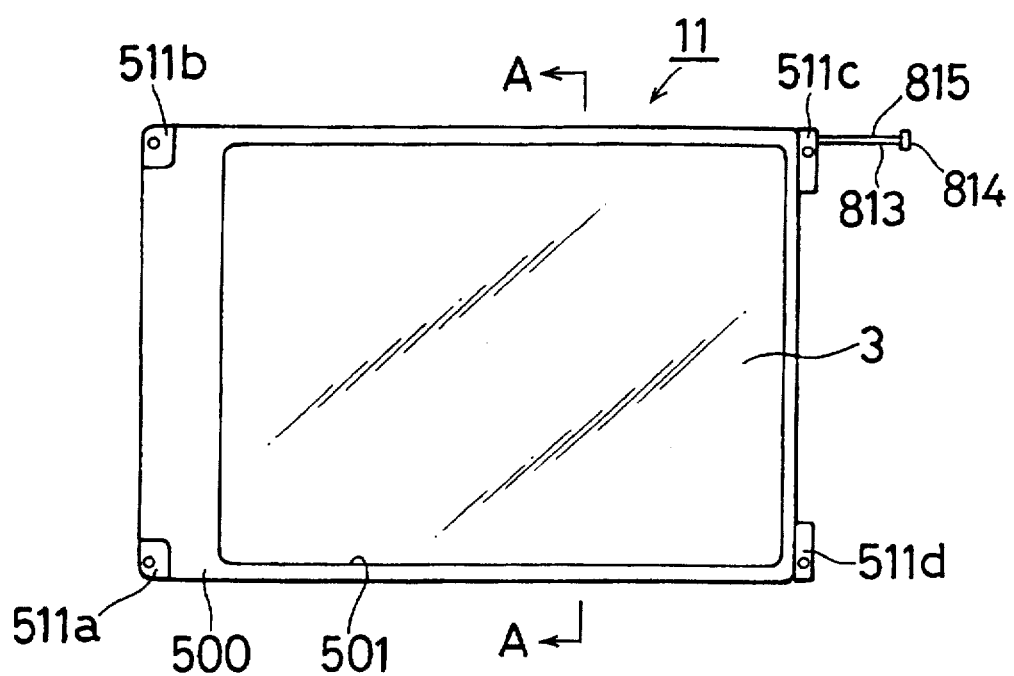
FIG. 1 is a plan view of the image display side of a flat panel display device according to a first preferred embodiment of the invention.

A first preferred embodiment of a liquid crystal display device according to the invention will now be described with reference to FIG. 1 through FIG. 5. In the drawings and the following description, the display side of the liquid crystal display device is the upper side thereof.

Figure 3:
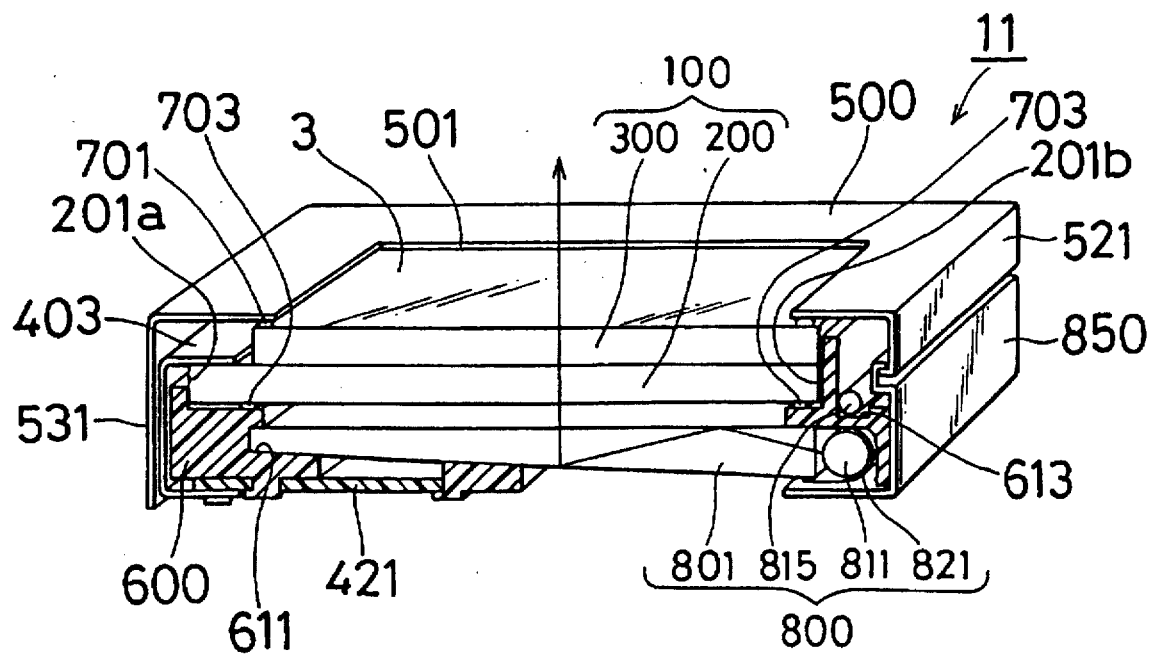
FIG. 3 is a sectional perspective view on the line A—A in FIG. 1.

As shown in FIG. 1 the liquid crystal display device (11) of this preferred embodiment is an active matrix type having a display area (3) 14 inches in diagonal, and as shown in FIG. 3 comprises a light-transmitting liquid crystal panel (100) and a surface iluminant light source (800) for illuminating this liquid crystal panel (100).

Figure 2:
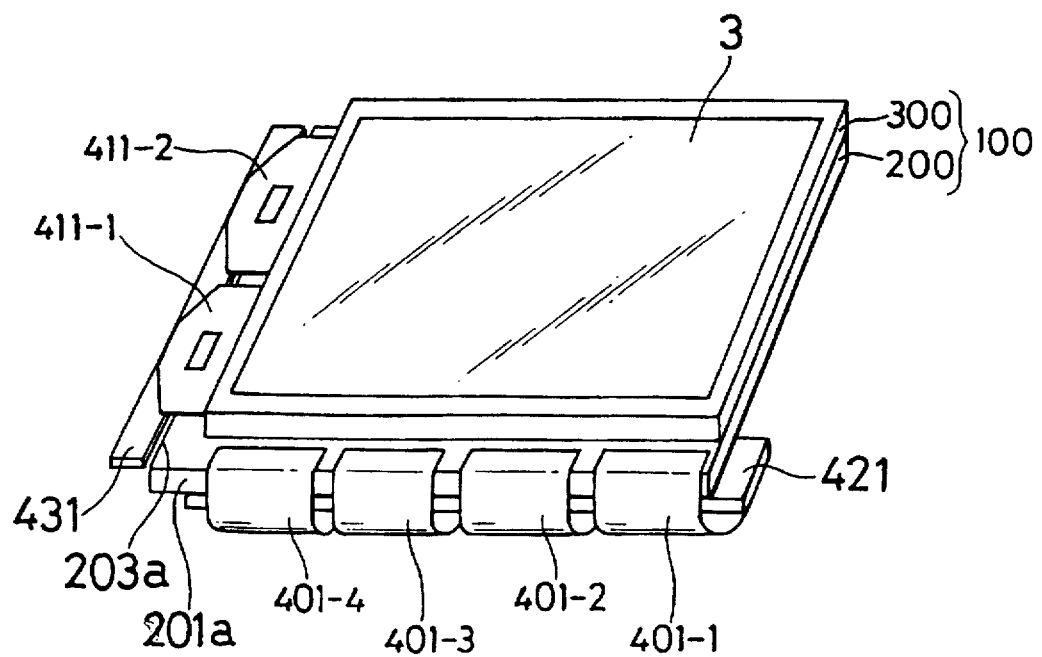
FIG. 2 is a perspective view of a liquid crystal panel of the flat panel display device of FIG. 1.

As shown in FIG. 2, the liquid crystal panel (100) is made up of an array substrate (200) comprising multiple signal lines and scanning lines on a 0.7 mm thick glass substrate, thin film transistors (hereinafter abbreviated to TFTs) connected to the signal lines and the scanning lines and pixel electrodes connected to the TFTs; a counter substrate (300) comprising a counter electrodes and a color filter layer formed on a 0.7 mm thick glass substrate and disposed facing the array substrate (200) so as to have a 5 μm gap between the array substrate (200) and the counter substrate (300); and a liquid crystal composition held in this gap.

In the liquid crystal panel (100) of this preferred embodiment, to take the external dimensions and especially the size of the peripheral area of the liquid crystal display device (11) small, the signal lines (not shown in the drawings) are led out only on a first side (201a) of the array substrate (200) and are connected with anisotropic conducting adhesive at this first side (201a) to X-TABs (401-1), (401-2), (401-3) and (401-4) for supplying display data to the signal lines. Also, the scanning lines are led out only on a second side (203a) of the array substrate (200) orthogonal to the first side (201a) and are connected at this second side (203a) to Y-TABs (411-1), (411-2).

The X-TABs (401-1) (401-2), (401-3) and (401-4) are bent around to the rear side of the liquid crystal panel (100) and connected with anisotropic conducting adhesive to an X control circuit board (421), disposed on the rear side of the liquid crystal panel (100), for controlling the X-TABs (401-1), (401-2), (401-3) and (401-4). The X control circuit board (421) is fixed to a resin frame (600) (see FIG. 3) which will be further discussed later.

The Y-TABs (411-1), (411-2) are connected with anisotropic conducting adhesive to a Y control circuit board (431), disposed at the end of the liquid crystal panel (100), for controlling the Y-TABs (411-1), (411-2). The electrical connection of the X-TABs (401-1), (401-2), (401-3) and (401-4) to the X control circuit board (421) and of the Y-TABs (411-1) and (411-2) to the Y control circuit board (431) may alternatively be achieved by soldering.

The surface iluminant light source (800) disposed on the rear side of the liquid crystal panel (100) is of edge-light type, as shown in FIG. 3, and has external dimensions slightly larger than those of the display area (3) of the liquid crystal panel (100). The surface iluminant light source (800) comprises a light-transmitting plate (801) which on its rear side either has an opaque scattering pattern formed by printing or has scattering grooves formed integrally therewith, a linear light source (811) of diameter 2.6 mm disposed near the light-transmitting plate (801) on a third side (201b) of the array substrate (200) opposite the first side (201a) where the X-TABs (401-1), (401-2), (401-3) and (401-4) are disposed, and a reflecting film (821) which wraps the linear light source (811) with opening to the light-transmitting plate (801) so that light from the linear light source (811) is efficiently guided into the light-transmitting plate (801).

As a result, light from the linear light source (811) enters the light-transmitting plate (801) through a side surface thereof, propagates through the inside of the light-transmitting plate (801) and is selectively emitted through the main surface of the light-transmitting plate (801) toward the liquid crystal panel (100).

This surface iluminant light source (800) is housed in a resin frame (600) formed integrally or so that it can be split. In particular, the light-transmitting plate (801) is held and fixed in a holding groove (611) and the linear light source (811) is held on the resin frame (600) so that it is exposed and can be replaced from the rear side.

Figure 4:
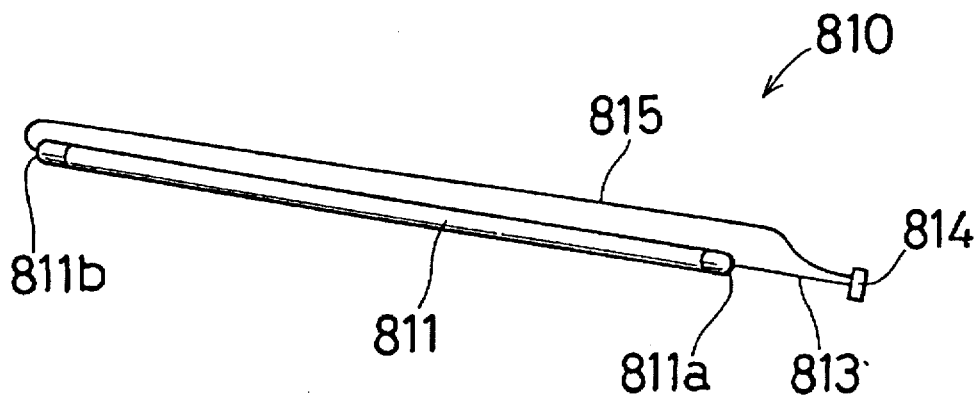
FIG. 4 is a schematic view of a linear light source.

As shown in FIG. 4, the linear light source (811) has a first feed lead (813) connected to the end (811a) thereof on a feed socket (814) side and a second feed lead (815) connected to the other end (811b). The first feed lead (813) is led out of the liquid crystal display device (11) proper to the feed socket (814) as shown in FIG. 1. The second feed lead (815) is led from the end (811b) toward the end (811a) of the linear light source (811) along a receiving guide (613) formed in the resin frame (600) above the linear light source (811) on the other side of the resin frame (600) and the reflecting film (821) from the linear light source (811), as shown in FIG. 3, and is then led out of the liquid crystal display device (11) proper to the feed socket (814) as shown in FIG. 1. One end of the reflecting film (821) is fixed between the light-transmitting plate (801) and the resin frame (600) and the other end is movable so that the linear light source (811) can be replaced.

As shown in FIG. 3, the liquid crystal display device (11) is made up of the liquid crystal panel (100) held by way of elastic members (701), (703) for absorbing external shocks between a boxlike stainless steel metal frame (500) of approximately 0.4 mm thick having a rectangular opening (501) corresponding to the display area (3) of the liquid crystal panel (100) and side walls (521), (531) and the resin frame (600) in which the surface iluminant light source (800) described above is held and fixed and is held together with screws at its four corners (511a), (511b), (511c) and (511d) as shown in FIG. 1.

In the liquid crystal display device (11) of this preferred embodiment the linear light source (811) is exposed on the rear side of the resin frame (600) so that replacement of the linear light source (811) is possible, and also the second feed lead (815) of the linear light source (811) is exposed through a gap (901) (see FIG. 5) between the resin frame (600) and the side wall (521) of the metal frame (500) run parallel with the linear light source (811).

In this preferred embodiment, the side wall (521) of the metal frame (500) has a bent end (523) projecting toward the liquid crystal panel (100). An approximately 0.3 mm thick stainless steel lamp cover (850), long in the direction of the linear light source (811) and L-shaped in cross-section, has a cross-sectionally C-shaped, hooklike bent end (853), and this hooklike bent end (853) engages with the bent end (523) of the metal frame (500). This lamp cover (850) protects the linear light source (811) and also closes the gap (901) exposing the second feed lead (815) between the metal frame (500) and the resin frame (600). The lamp cover (850) engages with and is held by claws (not shown in the drawings) formed on the resin frame (600).

As a result of the construction described above, even is the lengths of the side walls (521) and (531) of the metal frame (500) are made short along with the liquid crystal display device (11) being made thin, the rigidity of the metal frame (500) is increased by the bent end (523) of the side wall Also, because the lamp cover (850) engages with the metal frame (500) and is L-shaped in cross-section, the rigidity of the casing made up of the metal frame (500) housing the liquid crystal panel (100), the resin frame (600) and the lamp cover (850) can be amply increased.

As a result, even when the liquid crystal display device (11) is made thin and when the metal frame (500) and the resin frame (600) are made thin to make the liquid crystal display device (11) light, an ample rigidity can be obtained and the liquid crystal panel (100) is not damaged by shocks from outside.

Also, with the liquid crystal display device (11) of this preferred embodiment, because the signal lines and the scanning lines are respectively led out on the sides (201a), (203a) of the array substrate (200) and the X-TABs (401-1) to (401-4) are bent around to the rear side the display can be made thin. Furthermore, because the second feed lead (815) of the linear light source (811) dispose on the side (201b) of the array substrate (200) opposite the X-TABs (401-1) to (401-4) is efficiently accommodated above the linear light source (811), peripheral area of the liquid crystal display device (11) can be made smaller and it is possible to make its external dimensions amply small.

Furthermore, because the second feed lead (815) is disposed separated from the linear light source (811) by the resin frame (600), electrical current leakage is prevented and also there is the effect that the second feed lead (815) is protected.

Replacement of the linear light source (811) in the liquid crystal display device (11) of this preferred embodiment will now be described.

Figure 5:
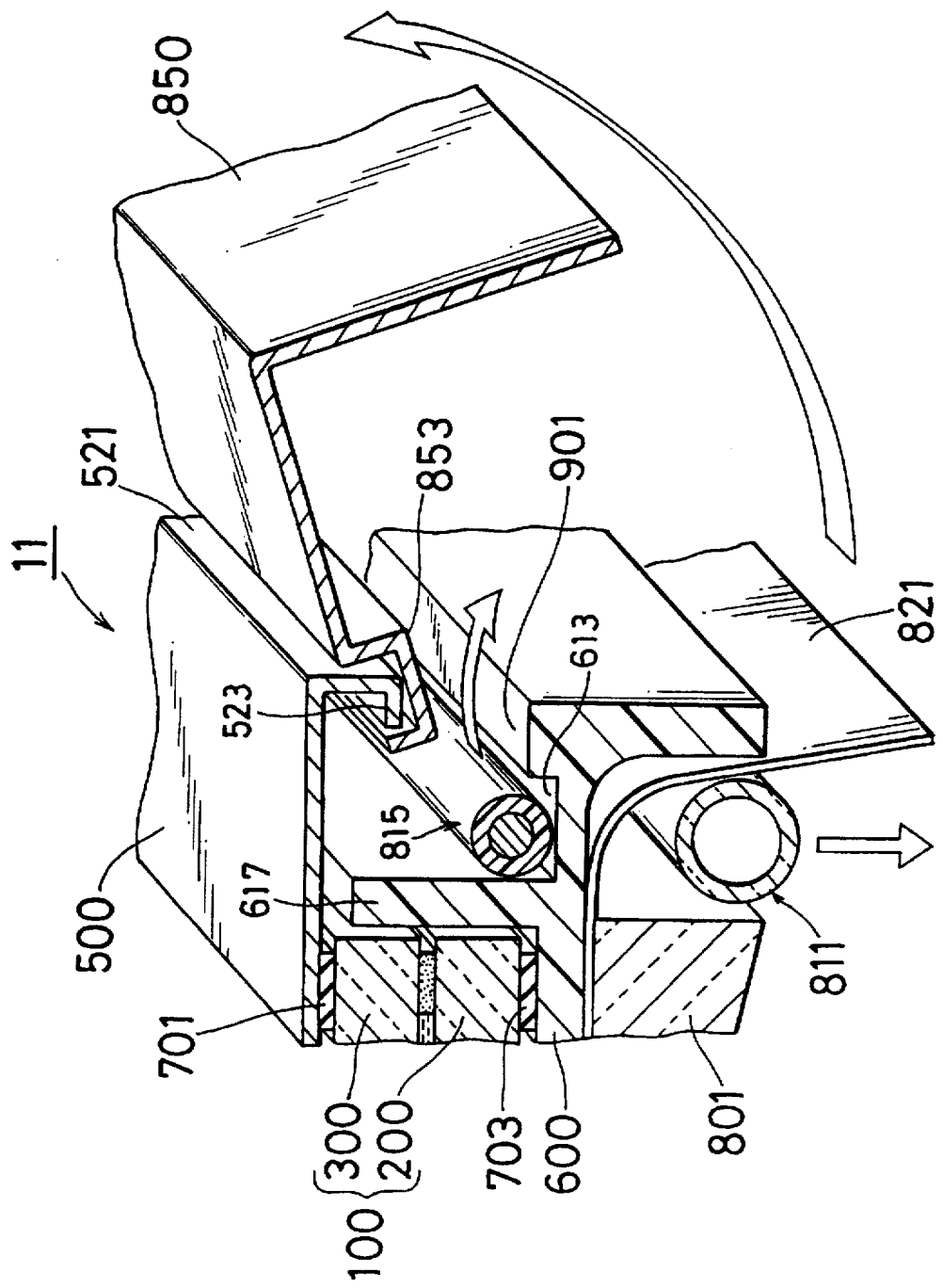
FIG. 5 is a sectional perspective view of the flat panel display device of FIG., 1 showing a characteristic part thereof and illustrating replacement of a linear light source used therein.

First, as shown in FIG. 5, the claws (not shown) of the resin frame (600) are disengaged from the lamp cover (850) and the lamp cover (850) is pivoted with respect to the bent end (523) of the metal frame (500) about the bent end (853) of the lamp cover (850).

As a result the second feed lead (815) is exposed through the gap (901) between the metal frame (500) and the resin frame (600) which had previously been close by the lamp cover (850). The second feed lead (815) of the linear light source (811) exposed through the gap (901) is then removed. Also, because the end of the reflecting film (821) not fixed between the light-transmitting plate (801) and the resin frame (600) is movable, when the lamp cover (850) is pivoted the linear light source (811), which had previously been covered by the lamp cover (850) and the reflecting film (821), is exposed on the rear side of the resin frame (600) and can be removed from the rear side of the liquid crystal display device (11).

In his way, it is possible to easily remove the linear light source part (810) consisting of the linear light source (811), the feed leads (813, 815) and the feed socket (814) from the liquid crystal display device (11). To refit the linear light source part (810), the procedure described above is carried out in reverse.

As described above, with the liquid crystal display device (11) of this preferred embodiment, because it is possible to remove the linear light source (811) from the liquid crystal display device (11) and refit it thereto easily, maintenance is simple. Furthermore, because all that need be replaced is the linear light source part (810), replacement can also be made inexpensive.

Although it is conceivable that while the linear light source (811) is being replaced, depending on the environment in which the work is carried out, dust and the like might get into the display through the gap (901) between the metal frame (500) and the resin frame (600), because the resin frame (600) has in the thickness direction thereof a rib (617) projecting toward the metal frame (500) and this cuts the liquid crystal panel (100) off from the outside, there are no adverse affects caused by the invasion of dust and the like.

Furthermore, although one end of the reflecting film (821) is rendered movable by the lamp cover (850) being pivoted, this end is normally sandwiched between the light-transmitting plate (801) and the lamp cover (850) and consequently is not moved out of position by shocks from outside.

Although none was particularly mentioned in the preferred embodiment described above, a diffusing sheet or a coverging sheet or the like may of course be suitably disposed between the light-transmitting plate (801) and the liquid crystal panel (100).

As described above, according to the liquid crystal display device of this preferred embodiment, the rigidity of the casing housing the liquid crystal panel can be kept high even if the frame is made thin in height or made thin in wall thickness to make the device thin or light and therefore occurrences of damage to the liquid crystal panel caused by outside shocks are reduced.

Furthermore, because according to this preferred embodiment it is possible to easily replace only the linear light source part just by removing the lamp cover and furthermore the invasion of dust and the like into the device during replacement is prevented, there are no display problems accompanying replacement of the lamp cover.

Figure 6:
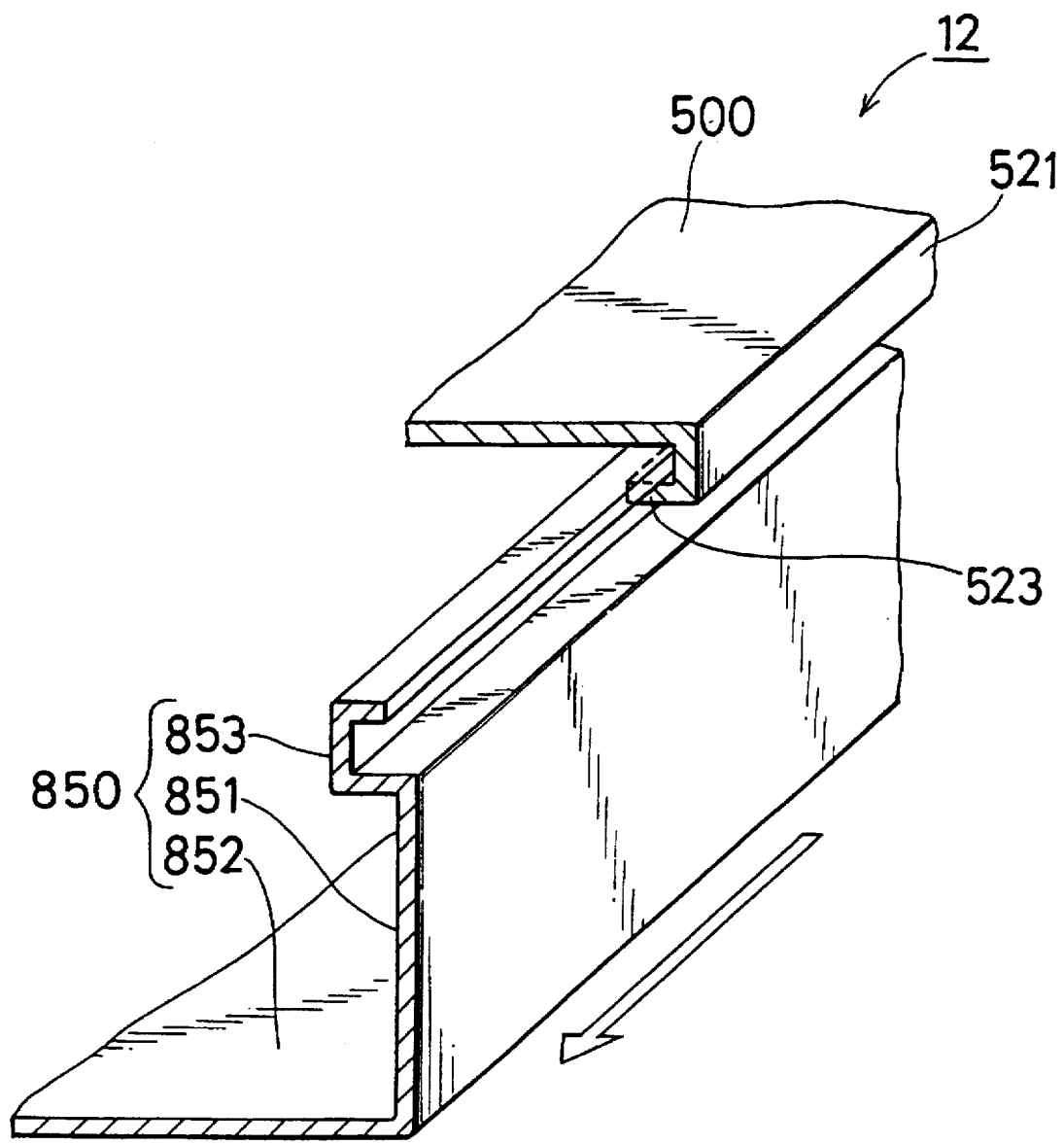
FIG. 6 is a sectional perspective view of characteristic parts of a flat panel display device of a second preferred embodiment of the invention.
Figure 7:
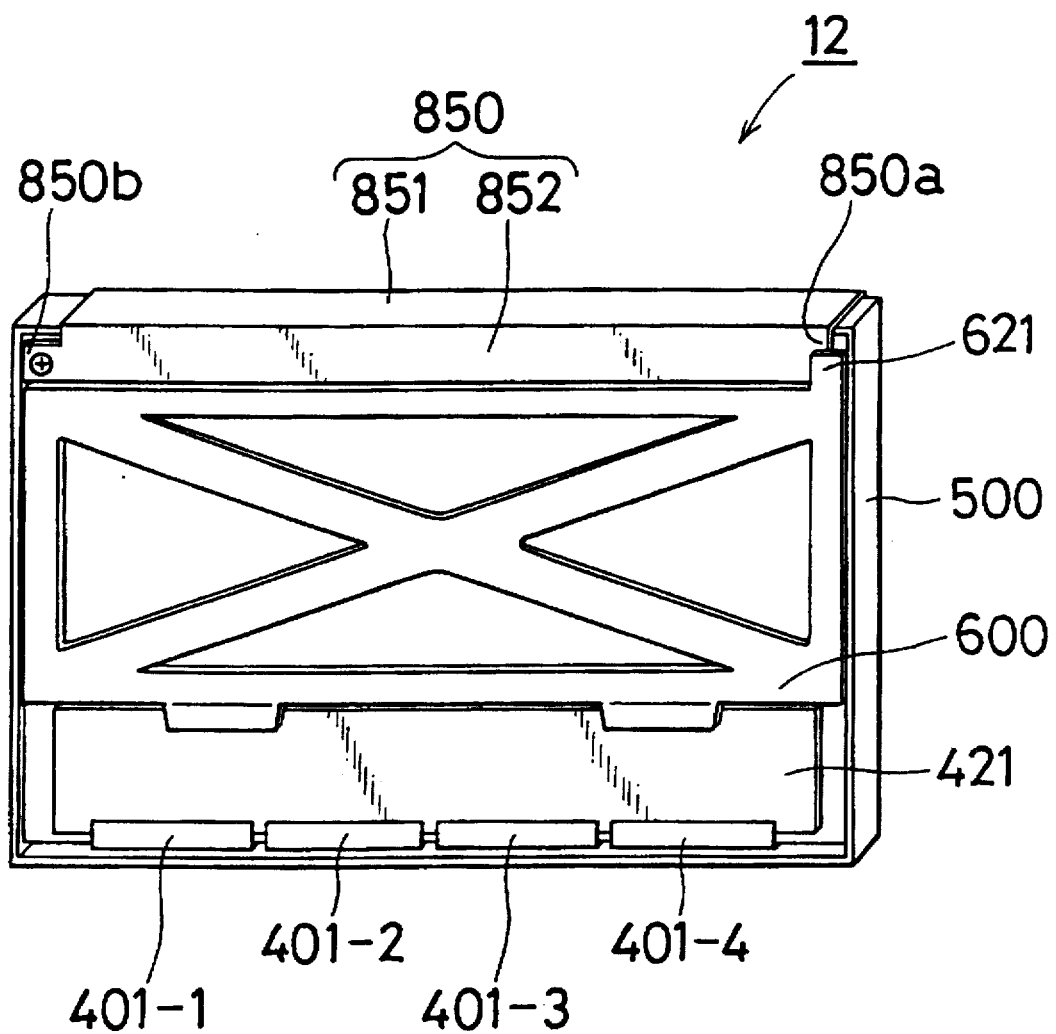
FIG. 7 is a perspective bottom view of the second preferred embodiment illustrating fixing of a lamp cover to the underside (the opposite side to the display side) of the flat panel display device.

A second preferred embodiment of the invention will now be described with reference to FIG. 6 through FIG. 8.

In a flat panel display device similar to the first preferred embodiment described above, as shown in FIG. 6 the lamp cover (850) is disposed slidably with respect to the metal frame (500). That is, the lamp cover (850) is disposed slidably in the length direction of the linear light source (811) along the engaging part where the bent end (853) of the lamp cover (850) engages with the bent end (523) of the metal frame (500). In the hooklike bent end (853) of the lamp cover (850) in this preferred embodiment, the width of the hook is smaller than in the first preferred embodiment. Also, the horizontal wall (852) of the lamp cover (850) engages with and is guided by an engaging projection (621) projecting from the resin frame (600). This engaging projection (621) is provided at a corner of this flat panel display device (12) and consequently engages with one end portion (850a) of the horizontal wall (852) of the lamp cover (850) when fitting of the lamp cover (850) has been completed. With the lamp cover (850) in this state, the other end portion (850b) of the horizontal wall (852) of the lamp cover (850) is screw-fastened to the resin frame (600) (see FIG. 7), and the lamp cover (850) is thereby fixed in its sliding direction.

Figure 8:
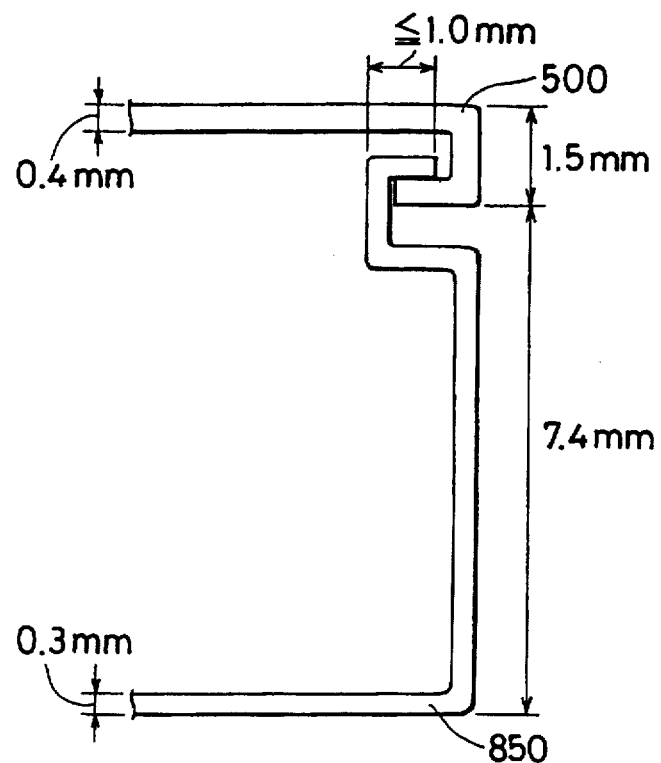
FIG. 8 is a sectional view showing a representative example of cross-sectional dimensions of a characteristic part of the second preferred embodiment.

FIG. 8 shows typical dimensions of the cross-sectional shapes of the metal frame (500) and the lamp cover (850) in this preferred embodiment. The thickness of the stainless steel metal frame (500) is about 0.4 mm, the thickness of the lamp cover (850), also made of stainless steel, is about 0.3 mm, and the width of the hooklike bent end (853) of the lamp cover (850) in the horizontal direction is about 1.0 mm or less. The width of the side wall of the lamp over (850) in the vertical direction is about 1.5 mm and the width of the vertical wall (851) of the lamp cover (850) is about 7.4 mm. The linear light source (811) and the second feed lead (815) have diameters of about 2.6 mm and about 1.6 mm respectively.

By means of the construction of this preferred embodiment, the same effects as those of the first preferred embodiment can be obtained. Also, in this preferred embodiment, because the linear light source (811) is not exposed by the lamp cover (850) being piloted, the display can be made even thinner.

A third preferred embodiment of the invention will now be described with reference to FIG. 9 through FIG. 10.

Figure 9:
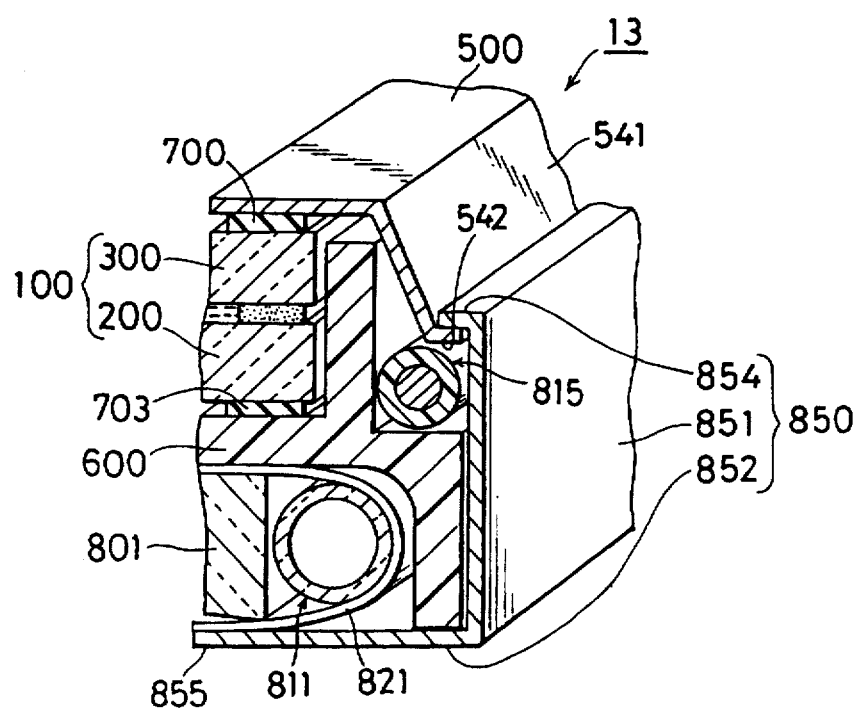
FIG. 9 is a sectional perspective view of a characteristic part of a third preferred embodiment of the invention.

In this preferred embodiment, a flat panel display device similar to that of the first preferred embodiment is constructed in the following way:

As shown in FIG. 9, the side wall (541) of the metal frame (500) is disposed in an inclined plane with its outer face facing upward, and the bent end (542) of the metal frame. (500) is a shelf portion projecting substantially horizontally toward the outside of this flat panel display devise (13). The bent end (854) of the lamp cover (850) is a shelf portion projecting from the vertical wall (851) substantially horizontally toward the inside of the flat panel display device (13) and forming an engaging portion pressing on the bent end (542) of the side wall (541). Here, the bent end (542) of the metal frame (500) and the bent end (854) of the lamp cover (850) are disposed slightly sloping downward toward the outside of the flat panel display device. The bent end (542) of the metal frame (500) is urged downward and the bent end (854) of the lamp cover (850) is urged upward. That is, the two bent ends (542, 854) are pressed against each other by urging forces and fixed with respect to each ether by frictional force. Also, the lamp cover (850) and the resin frame (600) are screw-fastened as shown in FIG. 7 and the horizontal wall (852) of the lamp cover (850) and the underside of the resin frame (600) are thereby fixed together.

Figure 10:
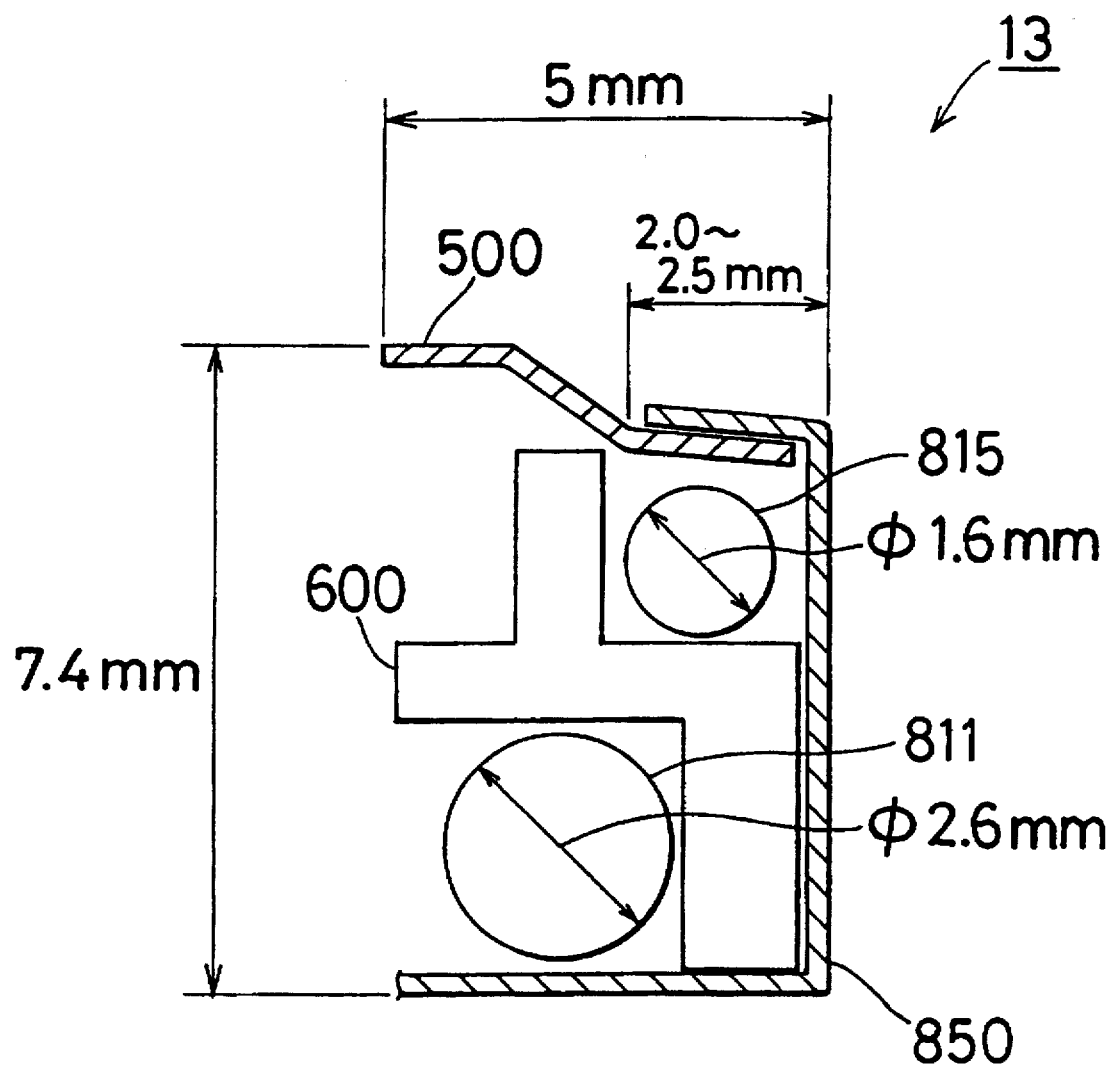
FIG. 10 is a sectional view of a representative example of cross-sectional dimensions of a main part of the third preferred embodiment.

FIG. 10 shows typical dimensions of the cross-sectional shapes of the metal frame (500) and the lamp cover (850) in this preferred embodiment. The thickness of the flat panel display device (13) is about 7.4 mm and the length from the peripheral edge of the flat panel display device (13) to the opening in the metal frame (500) is about 5 mm. As in the second preferred embodiment, the linear light source (811) and the second feed lead (815) have diameters of about 2.6 mm and about 1.6 mm respectively.

By means of this construction, the lamp cover (850) can be easily removed by releasing the screw-fastening and pulling the lamp cover (850) away from the flat panel display device. Also, because the engaging parts of the two bent ends (542, 854) slope downward toward the outside, the lamp cover (850) can be easily fitted just by pushing it onto the flat panel display device in the horizontal direction.

With this preferred embodiment, the same effects as those of the first preferred embodiment can be obtained. Also, with this preferred embodiment, because the side wall is inclined and the external shape of the display is that of a rectangular parellelopiped with an edge portion removed, the dimensions of the flat panel display device are correspondingly reduced.

In this preferred embodiment it is possible to provide one or more line-form or point-form projections and projection-receiving portions in the engaging surfaces of the bent ends and thereby make the engagement of the metal frame (500) and the lamp cover (850) in their predetermined positions more certain.

In this preferred embodiment, the lamp cover (850) can also be made removable by sliding in the direction of the side of the flat panel display device (13), i.e. in the length direction of the engaging parts.

A fourth preferred embodiment of the invention will now be described, with reference to FIG. 11.

In this preferred embodiment, a flat panel display device similar to that of the third preferred embodiment is constructed in the following way:

The second feed lead (815) consists of a flexible flat cable (FCC) (816) or a printed circuit board (PCB) and is disposed between the resin frame (600) and the vertical wall (851), (the wall disposed in the front-rear direction of the display) of the lamp cover (850). As the FFC, for example an FFC of thickness 0.2 mm made by Sumitomo Electric Industries, Ltd. can be used.

When a PCB comprising a metal conductor layer on an insulating substrate is used, the PCB is disposed with the metal conductor layer on the resin frame side. If this is done, it is not necessary to cover the metal conductor layer.

By means of this kind of construction, it is possible to obtain the same effects as those of the third preferred embodiment. Also, work this preferred embodiment not only does the structure of the flat panel display device become sample but also fitting and removal of the linear light source part (810) become easy.

Figure 11:
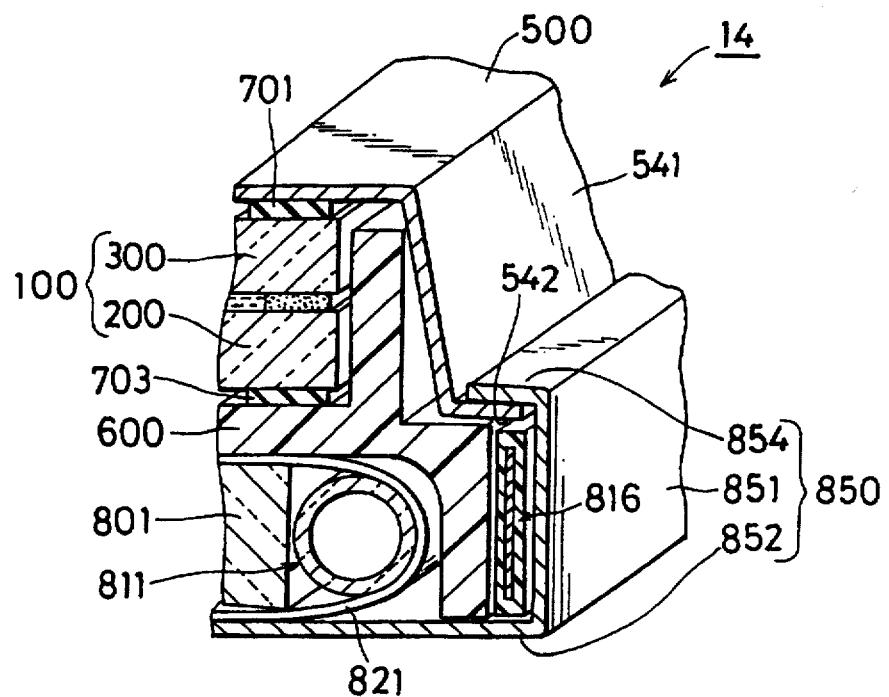
FIG. 11 is a sectional perspective view of a main part of a fourth preferred embodiment of the invention.
Figure 12:
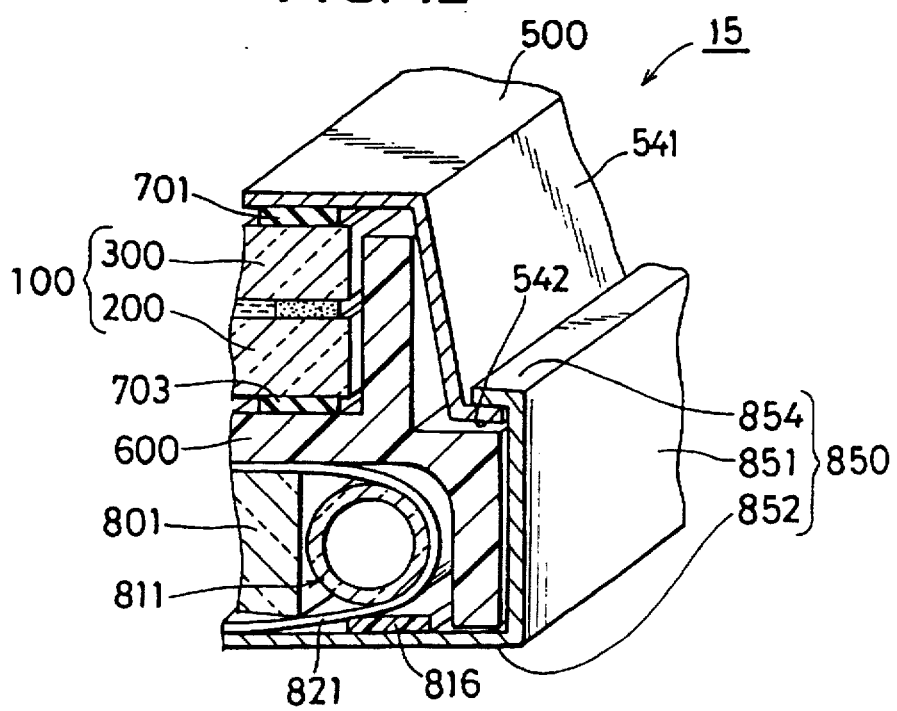
FIG. 12 is a sectional perspective view of a main part of a modified version of the fourth preferred embodiment of the invention.
Figure 13:
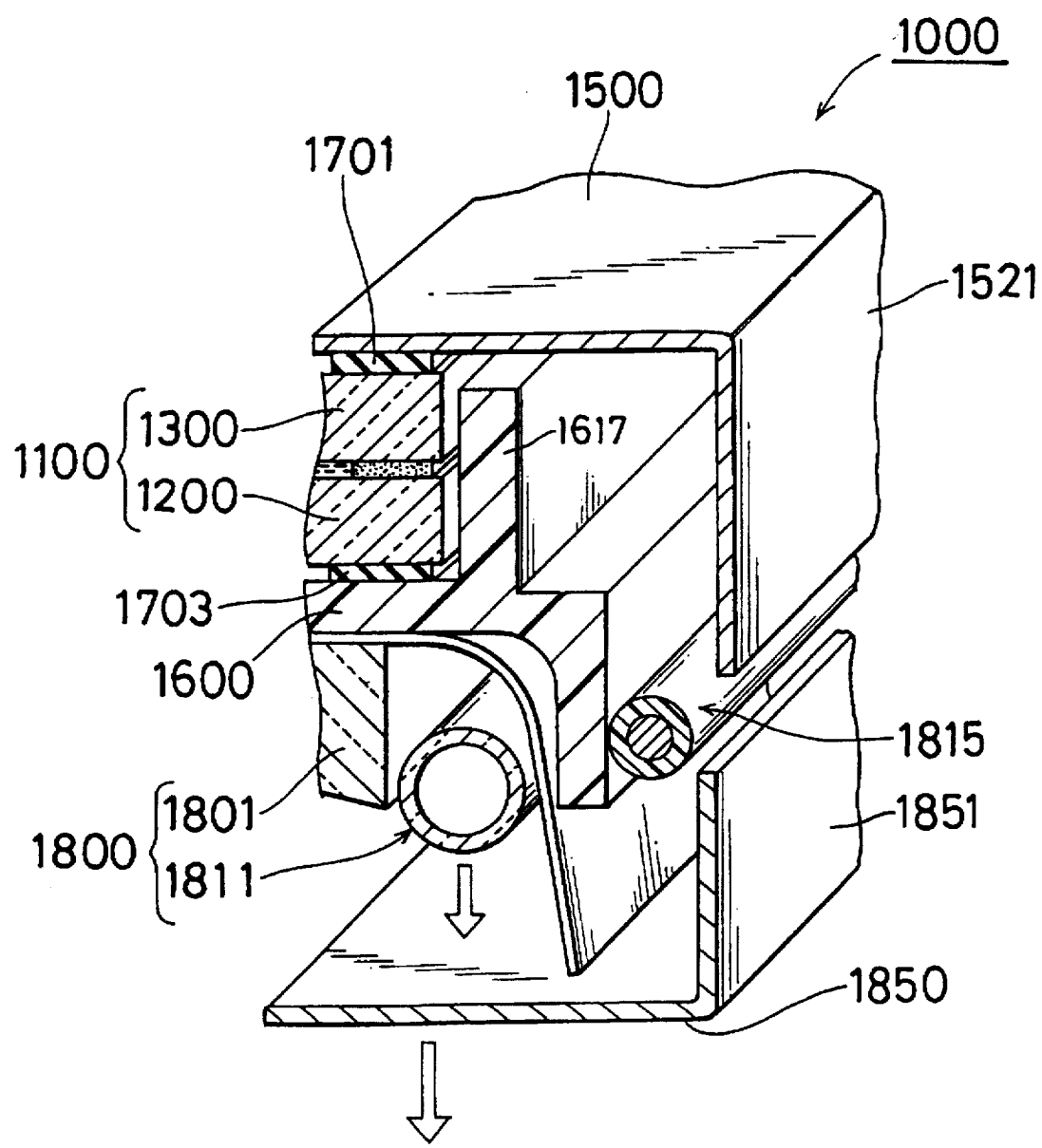
FIG. 13 is a sectional perspective view of a main part of a conventional flat panel display device.
Figure 14:
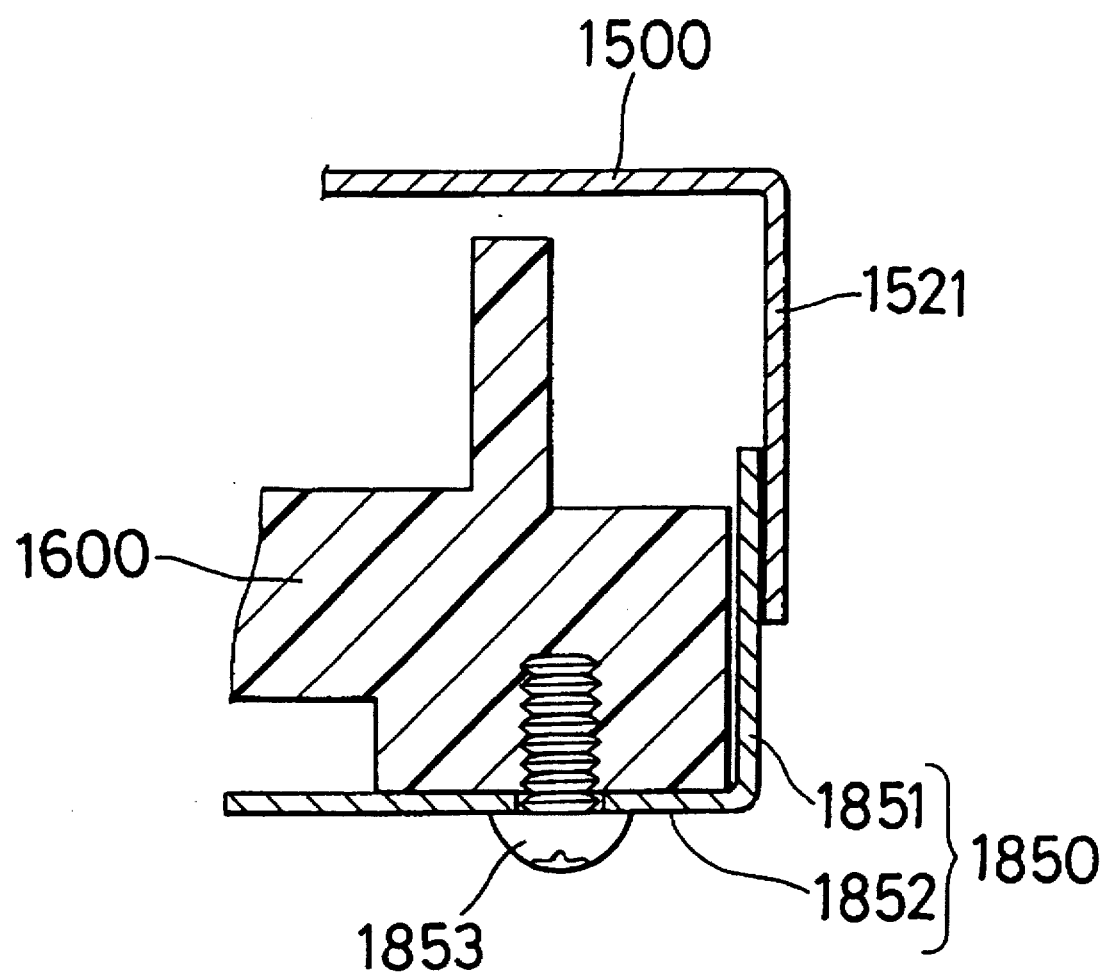
FIG. 14 is a sectional view illustrating fixing of a lamp cover in a conventional flat panel display device.

In the fourth preferred embodiment described above an FFC (816) or a PCB was disposed between the resin frame (600) and the vertical wall (851) of the lamp cover (850) as shown in FIG. 11, but alternatively an FFC (816) or a PCB may be disposed directly underneath the linear light source (811) with the reflecting film (821) therebetween, as shown in FIG. 12.

If this construction is adopted, the display can be made even thinner than that of the fourth preferred embodiment.

What is claimed is:

1. A flat panel display device comprising a flat display panel having a display area, a first frame for receiving the flat display panel which exposes the display area of the flat display panel and has a side wall corresponding to a side part of the flat display panel, a surface iluminant light source comprising a light source and a light-transmitting plate for transmitting and selectively emerging light from the light source, a second frame for receiving the surface iluminant light source and holding the flat display panel between the first and second frames and a light source protecting member for holding the light source between the light source protecting member and the second frame, wherein:

an upper end portion of one side of the light source protecting member includes a first bent and a lower end portion of one side wall of the first frame includes a second bent and the first and second bent ends engage with each other.

2. A flat panel display device according to claim 1 wherein:

a first feed lead is connected to the end of the light source on an electrical feed supply side thereof and a second feed lead is connected to the other end, and the second feed lead is led from said other end to said electrical feed supply side and is positioned at upper side of the light source.

3. A flat panel display device according to claim 2 wherein:

the second feed lead and the light source are separated by the second frame.

4. A flat panel display device according to claim 3 wherein:

the second feed lead is disposed directly above the light source.

5. A flat panel display device according to claim 1 wherein:

a first feed lead is connected to the end of the light source on an electrical feed supply side thereof and a second feed lead is connected to the other end, and the second feed lead is led from said other end to said electrical feed supply side and is positioned at lower side of the light source.

6. A flat panel display devise according to claim 5 wherein:

the second feed lead is disposed directly below the light source.

7. A flat panel display device according to claim 1 wherein:

a first feed lead is connected to the end of the light source on an electrical feed supply side thereof and a second feed lead is connected to the other end, and the second feed lead is led from said other end to said electrical feed supply side and is tape-shaped.

8. A flat panel display device according to claim 7 wherein:

the second feed lead comprises a flexible flat cable or a printed wiring board.

9. A flat panel display device according to claim 8 wherein:

the second feed lead is disposed to the side of the light source.

10. A flat panel display device according to claim 1 wherein:

the light source protecting member is disposed pivotably about an engaging portion of the bent ends and the light source is exposed and rendered replaceable by pivoting of the light source protecting member.

11. A flat panel display device according to claim 1 wherein:

the light source protecting member is disposed slidably along the longitudinal axis of the light source and the light source is exposed and rendered replaceable by sliding of the light source protecting member.

12. A flat panel display device according to claim 1 wherein:

the bent end of the first frame is a flange portion projecting outward, the bent end of the light source protecting member is a flange portion projecting inward, and the bent end of the light source protecting member is disposed above the bent end of the first frame.

13. A flat panel display device according to claim 1 wherein:

the light source protecting member is L-shaped in cross-section and comprises a vertical wall corresponding to said side wall of the first frame and a horizontal wall bent from the vertical wall.

14. A flat panel display device according to claim 13 wherein:

the second frame is disposed between the light source and the vertical wall of the light source protecting member.

* * * * *